United States Patent
Seemann et al.

(10) Patent No.: US 11,780,328 B2
(45) Date of Patent: Oct. 10, 2023

(54) DRIVE DEVICE FOR AN ELECTRICALLY DRIVEN AXLE OF A MOTOR VEHICLE

(71) Applicants: ZF Friedrichshafen AG, Friedrichshafen (DE); ZF Drivetech (Suzhou) Co. Ltd., Suzhou (CN)

(72) Inventors: Frank Seemann, Euerbach (DE); Paul Lenz, Waldkirchen (DE); Andreas Grossl, Kopfing (AT); Werner Hechberger, Fuerstenzell (DE); Kai Bornträger, Langenargen (DE); Maik Wörl, Immenstaad (DE); Marco Di Sarno, Osnabrück (DE); Cong Ren, Suzhou (CN)

(73) Assignees: ZF FRIEDRICHSHAFEN AG, Friedrichshafen (DE); ZF DRIVETECH (SUZHOU) CO. LTD., Suzhou (CN)

( * ) Notice: Subject to any disclaimer, the term of this patent is extended or adjusted under 35 U.S.C. 154(b) by 384 days.

(21) Appl. No.: 17/277,338

(22) PCT Filed: Sep. 17, 2019

(86) PCT No.: PCT/EP2019/074787
§ 371 (c)(1),
(2) Date: Mar. 18, 2021

(87) PCT Pub. No.: WO2020/058235
PCT Pub. Date: Mar. 26, 2020

(65) Prior Publication Data
US 2021/0347253 A1  Nov. 11, 2021

(30) Foreign Application Priority Data

Sep. 19, 2018 (DE) .................... 10 2018 215 918.1

(51) Int. Cl.
*B60K 17/04* (2006.01)
*B60K 1/02* (2006.01)
*B60K 1/00* (2006.01)

(52) U.S. Cl.
CPC .............. *B60K 17/046* (2013.01); *B60K 1/02* (2013.01); *B60K 2001/001* (2013.01)

(58) Field of Classification Search
CPC ... B60K 17/046; B60K 1/02; B60K 2001/001
See application file for complete search history.

(56) References Cited

U.S. PATENT DOCUMENTS

| 8,663,051 B2 * | 3/2014 | Sten ........................ F16H 48/36 475/221 |
| 2005/0023053 A1 * | 2/2005 | Bennett .................... B60K 6/52 180/65.1 |

(Continued)

FOREIGN PATENT DOCUMENTS

| DE | 102015217521 A1 | 3/2017 |
| EP | 0966361 B1 | 12/1999 |

(Continued)

OTHER PUBLICATIONS

International Search Report (English Translation) PCT/EP2019/074787, dated Jan. 24, 2020, (2 pages).

(Continued)

*Primary Examiner* — Erez Gurari
(74) *Attorney, Agent, or Firm* — Dority & Manning, P.A.

(57) ABSTRACT

A drive device for an electrically driven axle of a motor vehicle may include at least one electric machine, a shiftable transmission connected downstream from the at least one electric machine, and a differential coupled to the transmission for distributing drive torque to the axle. The transmission has first and second planetary gear sets connected in series. The at least one electric machine engages with an external toothing of a ring gear of the first planetary gear set.

(Continued)

A carrier of the first planetary gear set is rotationally fixed to a sun gear of the second planetary gear set. A sun gear of the first planetary gear set is detachably couplable to a housing. A ring gear of the second planetary gear set is coupled to the housing. A carrier of the second planetary gear set is an output of the transmission. The first planetary gear set is interlockable.

8 Claims, 4 Drawing Sheets

(56) References Cited

U.S. PATENT DOCUMENTS

| | | | | |
|---|---|---|---|---|
| 2008/0153651 A1* | 6/2008 | Matsubara | ........ | B60W 30/1884 475/151 |
| 2009/0118080 A1* | 5/2009 | Heap | ........ | B60K 6/445 477/3 |
| 2009/0312133 A1* | 12/2009 | Han | ........ | F16D 25/10 475/144 |
| 2012/0058855 A1* | 3/2012 | Sten | ........ | F16H 48/36 475/205 |
| 2012/0221197 A1* | 8/2012 | Hisada | ........ | B60L 1/003 74/665 F |
| 2012/0247269 A1* | 10/2012 | Horie | ........ | B60K 1/00 74/665 L |
| 2013/0192400 A1* | 8/2013 | Dodo | ........ | F16H 57/0476 74/421 A |
| 2013/0345010 A1* | 12/2013 | Kaltenbach | ........ | B60K 6/547 475/5 |
| 2014/0274527 A1* | 9/2014 | Sten | ........ | F16H 1/46 475/221 |
| 2015/0276032 A1* | 10/2015 | Ichikawa | ........ | F16H 57/0416 74/116 |
| 2016/0214473 A1* | 7/2016 | Kanada | ........ | B60K 6/405 |
| 2017/0074378 A1* | 3/2017 | Kirchner | ........ | F16H 1/28 |
| 2018/0216713 A1* | 8/2018 | LaForce | ........ | F16H 37/0813 |
| 2018/0304744 A1* | 10/2018 | Wang | ........ | B60K 17/165 |
| 2018/0304745 A1* | 10/2018 | Wang | ........ | B60K 1/02 |
| 2018/0363755 A1* | 12/2018 | Wakui | ........ | B60T 1/062 |
| 2019/0017573 A1* | 1/2019 | Schilder | ........ | B60K 1/04 |
| 2019/0329642 A1* | 10/2019 | Hori | ........ | F16H 57/037 |
| 2019/0359197 A1* | 11/2019 | Kaimer | ........ | B60K 17/046 |
| 2020/0031224 A1* | 1/2020 | Perry | ........ | B60K 17/08 |
| 2020/0055391 A1* | 2/2020 | Kumar | ........ | B60K 1/02 |
| 2020/0122572 A1* | 4/2020 | Kumar | ........ | B60K 17/02 |
| 2021/0102609 A1* | 4/2021 | Ghatti | ........ | B60K 1/00 |
| 2022/0281303 A1* | 9/2022 | Lutz | ........ | B60K 17/12 |
| 2022/0388391 A1* | 12/2022 | Gowrisankar | ........ | B60K 17/08 |
| 2023/0001777 A1* | 1/2023 | Wang | ........ | B60K 1/02 |
| 2023/0050981 A1* | 2/2023 | Suzuki | ........ | F16H 57/0424 |
| 2023/0099321 A1* | 3/2023 | Hannon | ........ | F16H 57/0436 475/5 |

FOREIGN PATENT DOCUMENTS

| | | |
|---|---|---|
| EP | 0966361 B1 | 5/2001 |
| WO | WO 2012/007829 A2 | 1/2012 |
| WO | WO 12007829 A2 | 1/2012 |
| WO | WO 2017/108168 | 6/2017 |
| WO | WO 2018/156676 | 8/2018 |
| WO | WO 2018/156706 | 8/2018 |

OTHER PUBLICATIONS

German Search Report 10 2018 215 918.1, dated Aug. 3, 2020, (10 pages).

* cited by examiner

DRIVE DEVICE FOR AN ELECTRICALLY DRIVEN AXLE OF A MOTOR VEHICLE

CROSS-REFERENCE TO RELATED APPLICATION

The present application is related and has right of priority to PCT Application No. PCT/EP2019/074787 filed on Sep. 17, 2019, the entirety of which is incorporated by reference for all purposes.

FIELD OF THE INVENTION

The present invention relates to a drive device for an electrically driven axle of a motor vehicle.

BACKGROUND

From the prior art, it is known to utilize axles that are electrically driven by electric machines in light duty and medium duty busses and trucks, which include one or two transmission stage(s), wherein the two-stage electrically driven axles are designed to be shiftable.

Electric machines are generally operated at high rotational speeds, for example, between 10,000 rpm-20,000 rpm, in order to achieve optimal efficiency. In order to utilize the high rotational speed level of electrically driven axles of a motor vehicle for vehicles, multi-stage transmissions are necessary, which must be designed as compact as possible for reasons related to installation space.

EP 0 966 361 B1 of the applicant describes an electrically driven vehicle with a vehicle chassis and vehicle axles, which are connected to the chassis via suspension links, with independent wheel drive of each driving wheel and with brake actuation of each driving wheel. Here, it is provided that the particular independent wheel drive is arranged in the direction of travel of the vehicle either in front of or behind the driving wheel and is connected to the driving wheel via a spur gear set, wherein the housing of the spur gear set functions as a semi-independent suspension or torsion beam and forms a part of the suspension of the axle carrying the driving wheel. The electric motors each drive, via a spur gear set formed from four externally toothed gearwheels in each case, a planetary transmission stage, which is arranged coaxially to the axis of rotation of the wheel.

WO 12007829 A2 describes an axle arrangement with a motor, a differential arrangement, a housing, a transmission, and a reduction gear set, wherein the transmission includes a first planetary gear set and a second planetary gear set, wherein the first and second planetary gear sets each include an assigned (i.e., first or second) ring gear, planet carrier, and sun gear. In the known axle arrangement, the first planet carrier is coupled to a differential carrier of the differential arrangement for common rotation, wherein the second ring gear is coupled to the housing in a rotationally fixed manner, the second planet carrier is coupled to the second differential output for common rotation, and wherein the second sun gear is coupled to the first sun gear for common rotation. Moreover, the reduction gear set is arranged between an output shaft of the motor and the first ring gear and includes a first gearwheel, which is coupled to the output shaft for common rotation, and a second gearwheel, which is coupled to the first ring gear for common rotation.

SUMMARY OF THE INVENTION

The problem addressed by example aspects of the present invention is that of providing a drive device for an electrically driven axle of a motor vehicle.

Accordingly, a drive device for an electrically driven axle of a motor vehicle is provided, which includes at least one electric machine and a shiftable transmission connected downstream from the at least one electric machine in the direction of power flow in the traction operation and coupled to a differential for distributing the drive torque to the wheels of the axle. The transmission includes a first planetary gear set and a second planetary gear set, which are minus or plus planetary gear sets, and which are connected in series. Each of the first and second planetary gear sets includes a ring gear, a sun gear, and a carrier. The drive of the transmission takes place via an external toothing of the ring gear of the first planetary gear set, the output of the first planetary gear set takes place via the carrier, where the carrier is connected to the sun gear of the second planetary gear set in a rotationally fixed manner. The sun gear of the first planetary gear set is detachably couplable to a housing via a first shift element. The ring gear of the second planetary gear set is coupled to a housing. The output of the transmission takes place via the carrier of the second planetary gear set. Moreover, the first planetary gear set is interlockable by engagement of a second shift element.

The sun gear of the first planetary gear set is detachably rotationally fixable to the carrier of the first planetary gear set by the second shift element, the sun gear of the first planetary gear set is detachably rotationally fixable to the ring gear by the second shift element, or the ring gear of the first planetary gear set is detachably rotationally fixable to the carrier by the second shift element.

The external toothing of the ring gear of the first planetary gear set is preferably oblique toothing. An appropriately designed input pinion of the at least one electric machine engages with the external toothing of the ring gear.

According to one advantageous embodiment of the invention, the ring gear of the first planetary gear set, which, according to example aspects of the invention, has external toothing, is doubly supported at the carrier by two bearings, one arranged at each end of the ring gear as viewed axially.

In this way, the ring gear is stabilized with regard to the radial forces generated by the first gear stage, namely the gear stage of the first planetary gear set. In addition, an oval deformation of the ring gear is prevented, wherein axial forces resulting from the oblique toothing of the ring gear are absorbed.

According to one advantageous refinement of the invention, the at least one electric machine, the transmission, and the differential are arranged in series transversely to the vehicle longitudinal direction. The transverse arrangement is made possible by the compact axial design of the transmission, wherein the transmission and the differential are arranged concentrically to an output shaft of the differential in such a way that the output shaft of the differential is guided through the transmission to a wheel of the electrically driven axle.

For the case in which two electric machines are provided, these are preferably arranged one behind the other, as viewed in the vehicle longitudinal direction, at each side of the output shaft of the differential, wherein their longitudinal axes extend parallel to the output shaft of the differential. For the case in which one electric machine is provided, its longitudinal axis extends parallel to the output shaft of the differential.

As a result, the advantage is achieved, that a highly compact design results in the vehicle longitudinal direction. In addition, advantageously, the width within the ladder frame is utilized in an optimal manner.

The transmission preferably has two gear ratios. The first gear ratio of the transmission is implemented by engaging the first shift element to couple the sun gear of the first planetary gear set to the housing. The second gear ratio is implemented by engaging the second shift element and, thereby, interlocking the first planetary gear set. The gear ratios may be implemented in reverse, where the reverse gear ratios are implemented by reversing the direction of rotation of the at least one electric machine. The clutches are multi-disk clutches, so the transmission can be shifted in a fully power shiftable manner. If the clutch for the first gear is a dog and the clutch for the second gear is a multi-disk clutch, traction shifts are power shiftable. If both clutches are dog clutches, shifts are only carried out with torque or tractive force interruption.

Due to the design according to example aspects of the invention, a drive device for an electrically driven axle of a motor vehicle is made available in a simple and cost-effective manner, which allows for a highly compact design in the vehicle longitudinal direction.

BRIEF DESCRIPTION OF THE DRAWINGS

Example aspects of the invention are explained in greater detail in the following, by way of example, with reference to the attached figures. Wherein.

DETAILED DESCRIPTION

Figure 1:
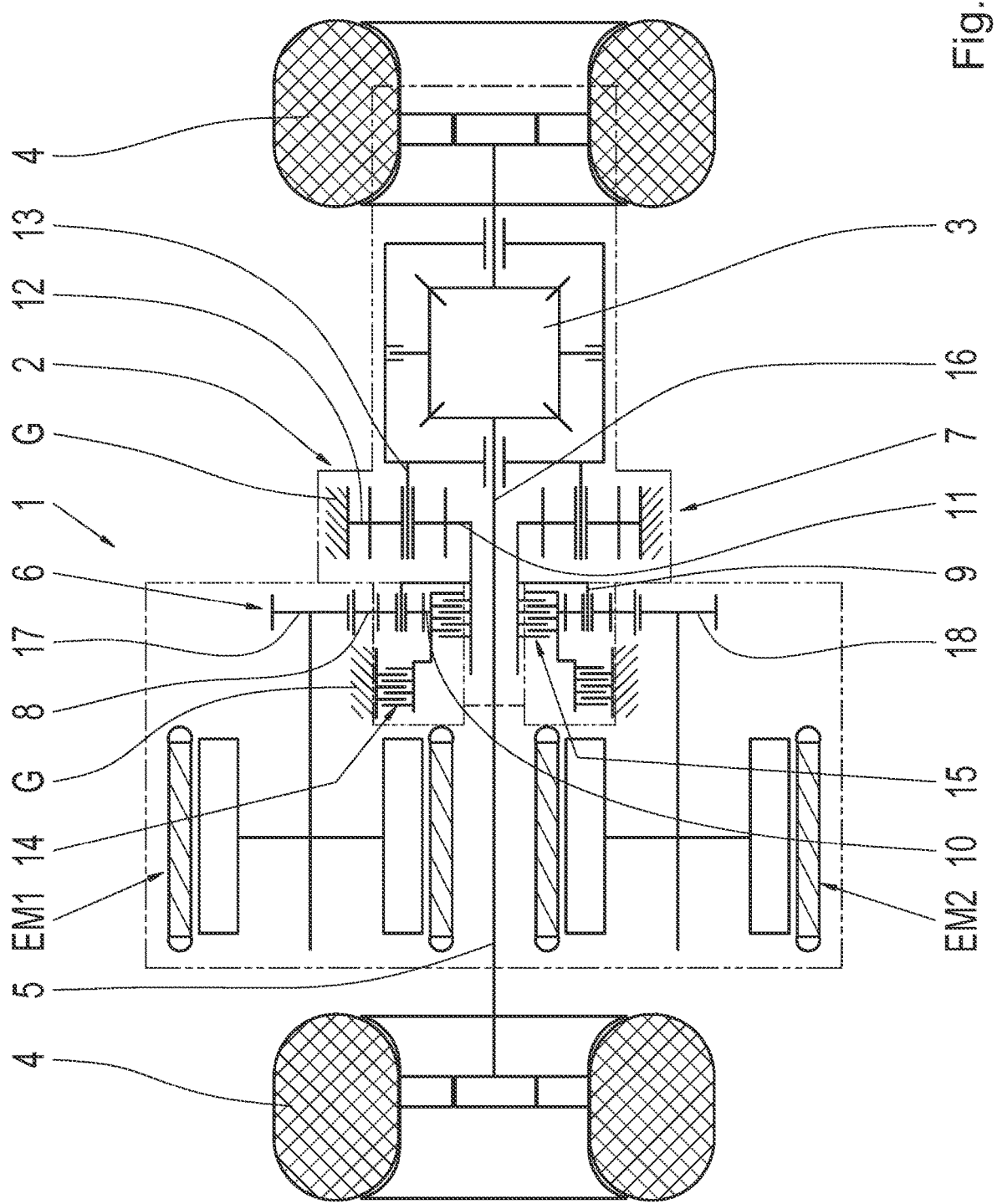
FIG. 1 shows a schematic view of one embodiment of the invention.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

With reference to the FIG. 1, a drive device 1 according to example aspects of the invention for an electrically driven axle of a motor vehicle is illustrated. The drive device 1 includes two electric machines EM1, EM2 and a shiftable transmission 2 connected downstream from the electric machines EM1, EM2 in the direction of power flow in the traction operation. The transmission 2 is coupled to a differential 3 for distributing the drive torque to wheels 4 of axle 5.

The transmission 2 includes a first minus planetary gear set 6 and a second minus planetary gear set 7, which are connected in series. The first planetary gear set includes a ring gear 8, a sun gear 10, and a carrier 9, and the second planetary gear set includes a ring gear 12, a sun gear 11, and a carrier 13. The input of the transmission 2 is an external toothing of the ring gear 8 of the first planetary gear set 6, and the output of the first planetary gear set 6 is the carrier 9. The carrier 9 of the first planetary gear set 6 is connected to the sun gear 11 of the second planetary gear set 7 in a rotationally fixed manner. An appropriately designed input pinion 17 of the first electric machine EM1 and an appropriately designed input pinion 18 of the electric machine EM2, engage into the external toothing of the ring gear 8 of the first planetary gear set 6, which is preferably oblique toothing.

Moreover, the sun gear 10 of the first planetary gear set 6 is detachably couplable to a housing G via a first shift element 14. The ring gear 12 of the second planetary gear set is coupled to the housing G. The output of the transmission 2 is the carrier 13 of the second planetary gear set 7.

Figure 3:
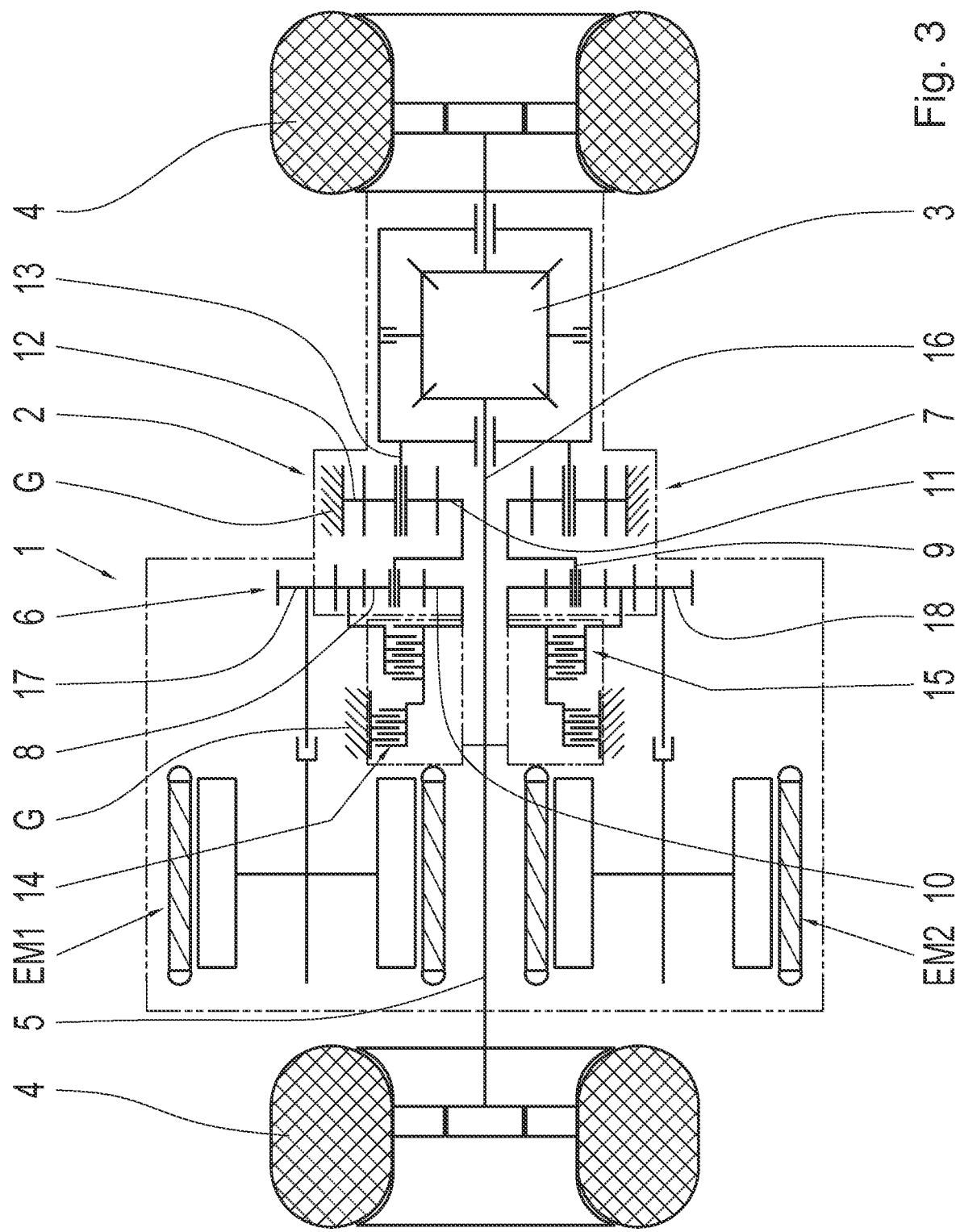
FIG. 3 shows a schematic view of another embodiment of the invention.
Figure 4:
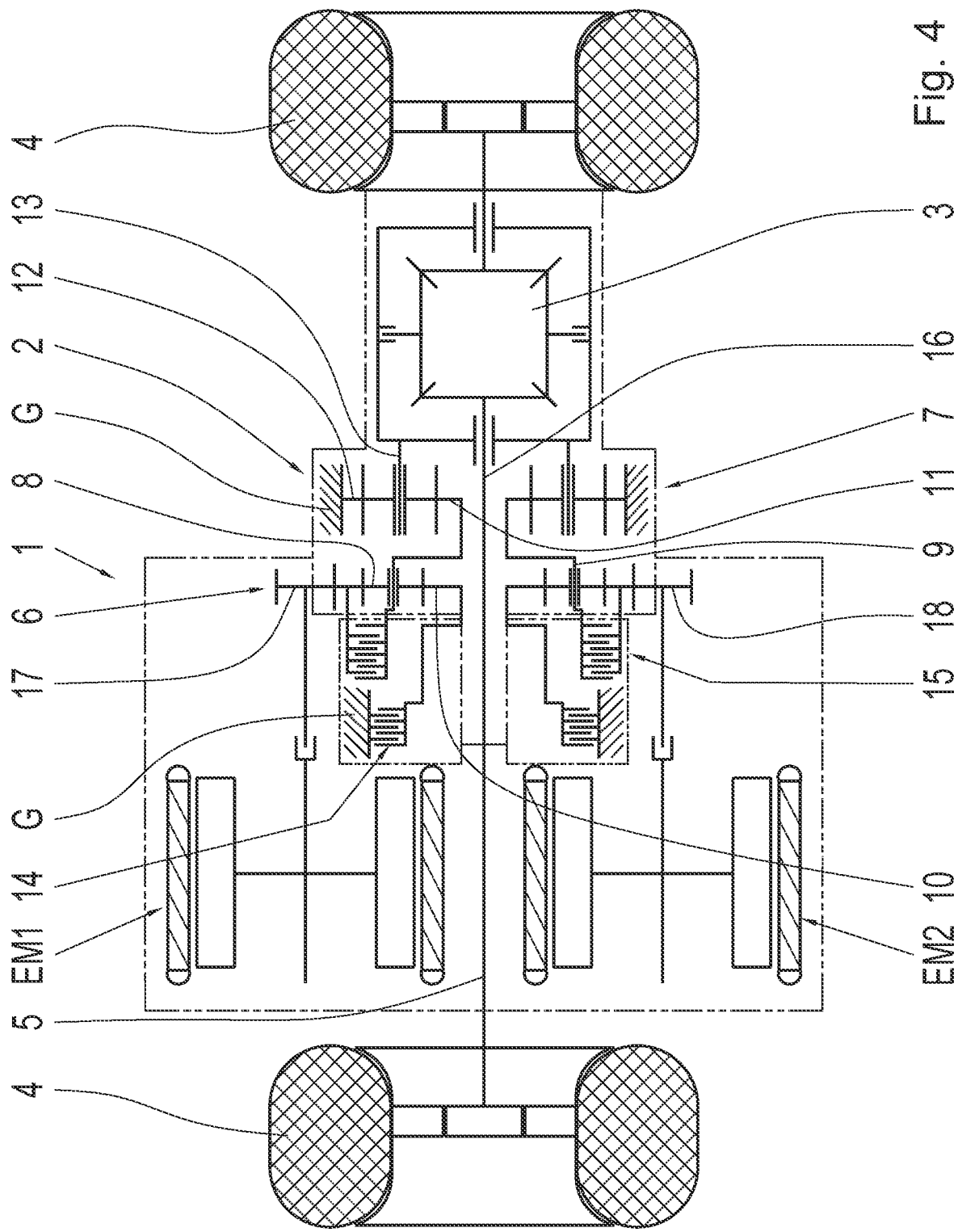
FIG. 4 shows a schematic view of a further embodiment of the invention.

Moreover, a second shift element 15 is provided, via the engagement of which the first planetary gear set 6 is interlockable. In the example shown in FIG. 1, the sun gear 10 of the first planetary gear set 6 is detachably rotationally fixable to the carrier 9 of the first planetary gear set 6 by the second shift element 15. Alternatively, the sun gear 10 of the first planetary gear set 6 is detachably rotationally fixable to the ring gear 8 of the first planetary gear set 6 by the second shift element 15, as shown in FIG. 3. In another alternative, the ring gear 8 of the first planetary gear set 6 is detachably rotationally fixable to the carrier 9 of the first planetary gear set 6 by the second shift element 15, as shown in FIG. 4.

In the example shown in FIG. 1, the electric machines EM1, EM2 are arranged one behind the other, as viewed in the vehicle longitudinal direction, at each side of an output shaft 16 of the differential 3, wherein their longitudinal axes extend parallel to the output shaft 16 of the differential 3. Moreover, the electric machines EM1, EM2 (considered as a unit), the transmission 2, and the differential 3 are arranged in series transversely to the vehicle longitudinal direction, wherein the transmission 2 and the differential 3 are arranged concentrically to the output shaft 16 of the differential 3.

For this purpose, the carrier 9, 13 and the sun gear 10, 11 of each of the first and second planetary gear sets 6, 7 are hollow, and so the output shaft 16 of the differential 3 is guided through the transmission 2 to a wheel 4 of the electrically driven axle 5.

Figure 2:
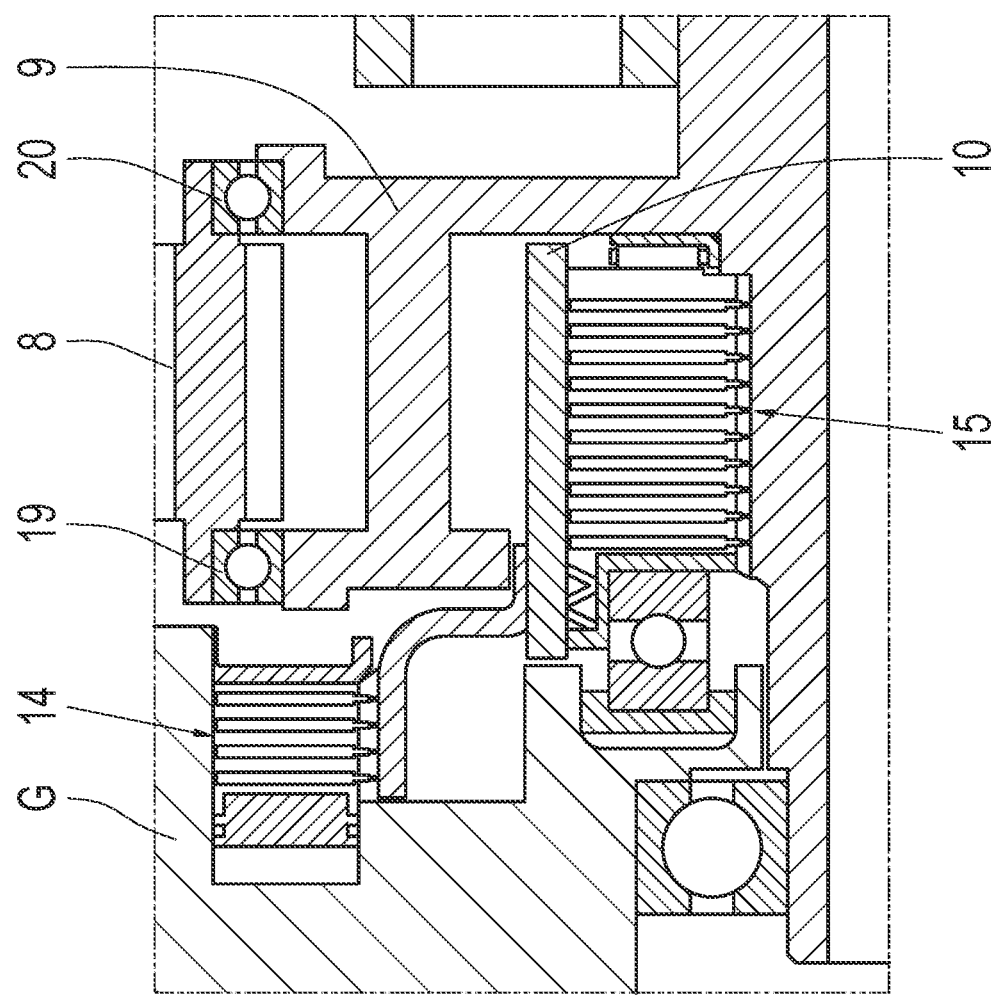
FIG. 2 shows a schematic view of the double support of an externally toothed ring gear of a first planetary gear set of the transmission according to example aspects of the invention.

According to one advantageous embodiment of the invention and with reference to FIG. 2, the ring gear 8 of the first planetary gear set 6 of the transmission 2, which is, according to example aspects of the invention, externally toothed, is doubly supported at the carrier 9 of the first planetary gear set 6 by two radial bearings 19, 20, one arranged at each end of the ring gear 8, as viewed axially. As a result, the ring gear 8 is stabilized with regard to the radial forces generated by the gear stage of the first planetary gear set 6.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 drive device
2 transmission 3 differential
4 wheel
5 electrically driven axle
6 first planetary gear set
7 second planetary gear set
8 ring gear of the first planetary gear set
9 carrier of the first planetary gear set
10 sun gear of the first planetary gear set
11 sun gear of the second planetary gear set
12 ring gear of the second planetary gear set
13 carrier of the second planetary gear set
14 first shift element
15 second shift element
16 output shaft
17 input pinion
18 input pinion
19 bearing
20 bearing
G housing
EM1 electric machine
EM2 electric machine

The invention claimed is:

1. A drive device (1) for an electrically driven axle of a motor vehicle, comprising:
an electrically driven axle (5);
at least one electric machine (EM1, EM2);
a shiftable transmission (2) connected downstream from the at least one electric machine (EM1, EM2) in a direction of power flow for a traction operation, the transmission (2) comprising
a housing (G),
a first planetary gear set (6),
a second planetary gear set (7) connected in series with the first planetary gear set (6),
a first shift element (14), and
a second shift element (15); and
a differential (3) coupled to the transmission (2) for distributing drive torque to a wheel (4) of the electrically driven axle (5),
wherein a ring gear (8) of the first planetary gear set (6) has an external toothing;
wherein the at least one electric machine (EM1, EM2) engages with the external toothing of the ring gear (8) of the first planetary gear set (6) as an input to the transmission (2),
wherein a carrier (9) of the first planetary gear set (6) is rotationally fixed to a sun gear (11) of the second planetary gear set (7) as an output for the first planetary gear set (6),
wherein a sun gear (10) of the first planetary gear set (6) is detachably couplable to the housing (G) by the first shift element (14),
wherein a ring gear (12) of the second planetary gear set (7) is coupled to the housing (G),
wherein a carrier (13) of the second planetary gear set (7) is an output of the transmission (2), and
wherein the first planetary gear set (6) of the transmission (2) is interlockable by the second shift element (15).

2. The drive device (1) of claim 1, wherein:
the sun gear (10) of the first planetary gear set (6) is detachably rotationally fixable to the carrier (9) of the first planetary gear set (6) by the second shift element (15),
the sun gear (10) of the first planetary gear set (6) is detachably rotationally fixable to the ring gear (8) of the first planetary gear set (6) by the second shift element (15), or
the ring gear (8) of the first planetary gear set (6) is detachably rotationally fixable to the carrier (9) of the first planetary gear set (6) by the second shift element (15).

3. The drive device (1) of claim 1, wherein the external toothing of the ring gear (8) of the first planetary gear set (6) is oblique toothing.

4. The drive device (1) of claim 1, wherein the ring gear (8) of the first planetary gear set (6) is doubly supported at the carrier (9) by a first bearing (19) at a first axial end of the ring gear (8) of the first planetary gear set (6) and a second bearing (20) at a second axial end of the ring gear (8) of the first planetary gear set (6).

5. The drive device (1) of claim 1, wherein the transmission (2) has two gear ratios, wherein a first gear ratio of the two gear ratios is implemented when the first shift element (14) is engaged, and wherein a second gear ratio of the two gear ratios is implemented when the second shift element (15) is engaged.

6. The drive device (1) of claim 1, wherein the at least one electric machine (EM1, EM2), the transmission (2), and the differential (3) are arranged in series in a direction transverse to a vehicle longitudinal direction,
wherein the transmission (2) and the differential are concentric to an output shaft (16) of the differential (3), and
wherein the carrier (9, 13) and the sun gear (10, 11) of each of the first and second planetary gear sets (6, 7) are hollow such that the output shaft (16) of the differential (3) extends through the transmission (3) to the wheel (4) of the electrically driven axle (5).

7. The drive device (1) of claim 6, wherein the at least one electric machine (EM1, EM2) comprises two electric machines (EM1, EM2), the two electric machines (EM1, EM2) being arranged one behind the other, as viewed in the vehicle longitudinal direction, on opposite sides of the output shaft (16) of the differential (3), and a longitudinal axis of each of the two electric machines (EM1, EM2) extending parallel to the output shaft (16) of the differential (3).

8. The drive device (1) of claim 6, wherein the at least one electric machine comprises one electric machine, a longitudinal axis of the one electric machine extending parallel to the output shaft (16) of the differential (3).

* * * * *